United States Patent
Jones

[15] 3,700,206
[45] Oct. 24, 1972

[54] VALVE ASSEMBLY

[72] Inventor: Evan Jones, Evanston, Ill.

[73] Assignee: Henry Valve Company, Melrose Park, Ill.

[22] Filed: April 15, 1971

[21] Appl. No.: 134,336

Related U.S. Application Data

[63] Continuation-in-part of Ser. No. 34,483, May 4, 1970, abandoned.

[52] U.S. Cl. ...................... 251/84, 251/88, 251/297, 24/222 B, 24/224 R, 85/8.8, 85/9 R, 85/55, 287/20
[51] Int. Cl. ............................................. F16k 25/00
[58] Field of Search .....24/230, 217, 224 LS, 224 PS, 24/222 B, 222 BS, 224 R; 287/20; 85/8.8, 9 R, 55; 251/84–88, 297

[56] References Cited

UNITED STATES PATENTS

| 690,490 | 1/1902 | Walters | 251/88 |
|---|---|---|---|
| 882,483 | 3/1908 | Wilson | 24/224 B UX |
| 1,200,518 | 10/1916 | Orewiler | 24/224 B X |
| 3,349,589 | 10/1967 | Fricke | 24/230 R X |
| 3,445,979 | 5/1969 | Meyer | 52/718 |

FOREIGN PATENTS OR APPLICATIONS

| 569,699 | 1/1924 | France | 251/88 |
|---|---|---|---|
| 1,408,411 | 7/1965 | France | 52/718 |
| 522,229 | 4/1931 | Germany | 251/88 |

*Primary Examiner*—Henry T. Klinksiek
*Attorney*—Greist, Lockwood, Greenawalt & Dewey

[57] ABSTRACT

The valve assembly includes an integral member or molded part which serves as a one-piece valve seat disc and which is mounted on a metal valve stem received in a valve body and arranged for movement along an axis essentially coaxial with the axis of a valve seat at the entrance to a passage within the valve body. The valve stem has a button at its inner end for mounting the valve seat disc and is rotatably reciprocal in the valve body for moving the valve seat disc to and from the valve seat. The valve seat disc is made from a material which is stiff, but resilient, and which has a low coefficient of friction with respect to metal to permit relative rotation between the disc and the stem when the stem bears against the disc. The disc is defined by a seating section having a seating surface for seating on the valve seat and a valve stem coupling section having an opening in which the button is received. The opening has a lateral extent somewhat greater than the lateral extent of the button and is characterized by projections therein which snap-fittingly receive and retain the button within the opening for securely holding the valve seat disc to the inner end of the valve stem and yet allowing it to move a limited distance laterally of the axis of the valve stem so that the disc will properly seat itself on, and align itself with respect to, the valve seat. In one embodiment, the projections have axially extending protuberances thereon which bear against the underside of the button to firmly hold the disc against axial movement thereof relative to the stem.

6 Claims, 9 Drawing Figures

PATENTED OCT 24 1972 3,700,206

INVENTOR
EVAN JONES
BY
ATT'YS.

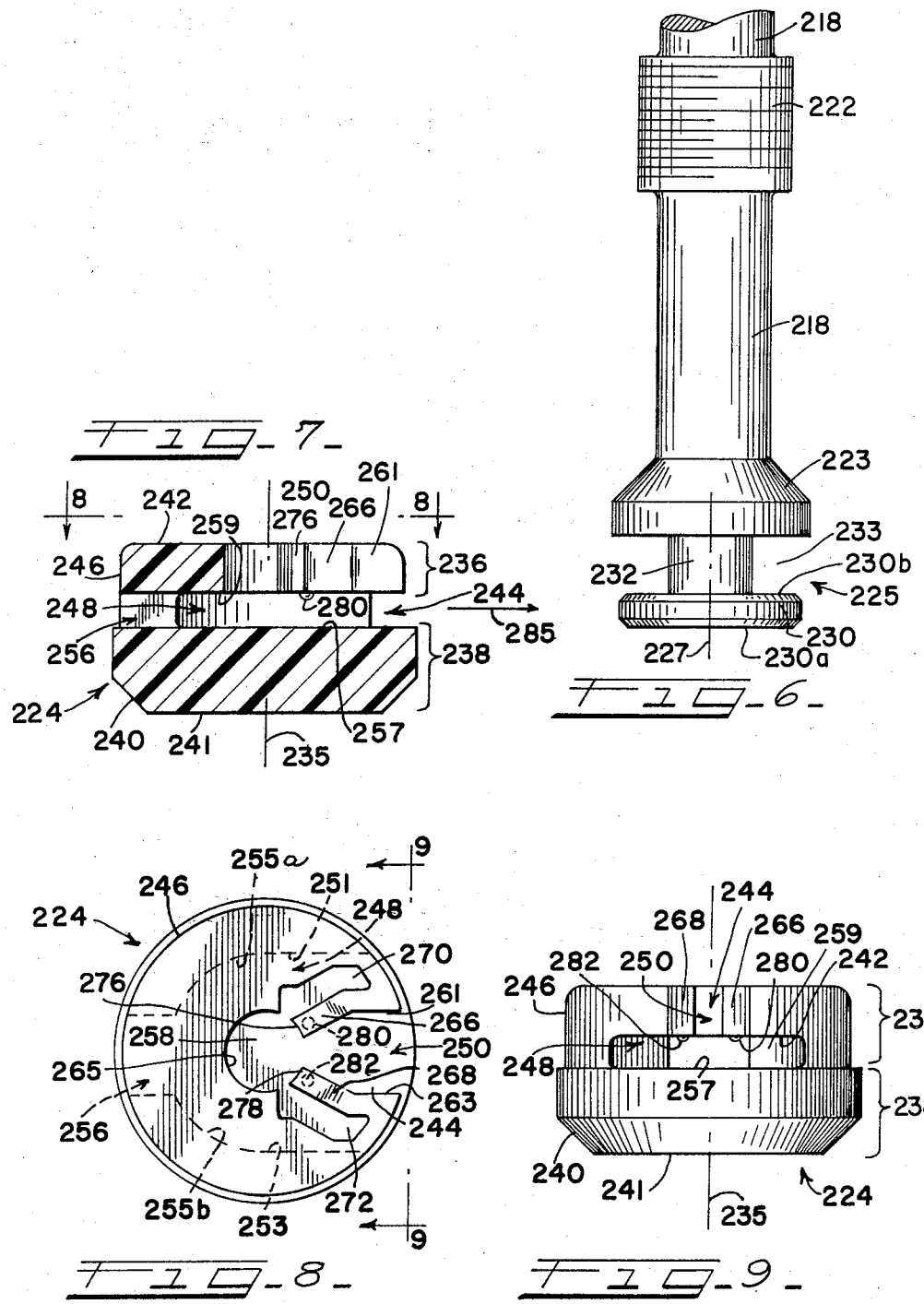

VALVE ASSEMBLY

This application is a continuation-in-part of application Ser. No. 34,483, filed May 4, 1970, now abandoned.

This invention generally relates to an integral member such as a molded part which is snap-fittingly connected to the end portion, such as a button, of another member or part. More specifically, the present invention relates to a valve seat disc of one piece construction which is loosely mounted on the end of a valve stem without the use of any other parts such as clips, retaining rings, springs, nuts, etc., and in such a way that the valve seat disc can move a limited distance laterally of the axis of the valve stem when the disc is moved to a valve closed position against a valve seat whereby the disc is self-aligning when the axis of the valve stem is not exactly in line with the axis of the valve seat.

In the past, various valve seating means, such as a valve seating member or a seating ring which can move a limited distance laterally of the axis of the valve stem for self-aligning of the seating member or ring when it is seated on a valve seat, have been used in valve assemblies. However, these known valve assemblies require a number of parts, are relatively awkward and complicated to assemble, are expensive and are not always effective or reliable.

One known valve seating member is generally cylindrical and has a seating surface with low friction properties secured to a first end and a button formed at a second end which is received in a laterally extending "C" shaped slot in the end of a valve stem for loosely mounting the valve seating member on the valve stem such that the seating member is self-aligning (i.e., it can move laterally of the axis of the valve stem) when it is moved by the valve stem against a valve seat in a bore. A cup shaped fitting is rotatably reciprocal on the valve stem so that the rim of the fitting can be positioned about the second end of the seating member to loosely hold the seating member to the valve stem. Also the cylindrical valve seating member requires two O-ring seals mounted in annular grooves on the outer cylindrical surface thereof for sealing engagement with the sides of the bore in which the member is received. It is apparent that this self-aligning valve seating member requires a number of parts, is awkward and complicated to assemble and consequently is expensive to manufacture.

One known seating ring has a central aperture, has a frusto-conical shape made of a plastic material, and is mounted at the end of a valve stem by means of a rivet which is received through the central aperture of the seating ring and then driven into a bore extending axially into the end of the valve stem. It will be understood that the rivet cannot be driven too far into the axial bore in order that the seating ring is allowed to rotate on the shank portion of the rivet. In this valve assembly the central aperture of the seating ring is somewhat larger than the outer diameter of the shank portion of the rivet so that the seating ring can move a limited distance laterally of the axis of the valve stem for self-aligning of the seating ring when it is seated on a valve seat. By having two parts, a seating ring and a rivet, and by requiring careful assembly of the two parts on the valve stem, this valve assembly is relatively expensive and not always reliable.

Another known valve assembly utilizes a metal valve seat disc having an axial bore in which the end of a valve stem is received. The valve seat disc is held on the valve stem by means of several retainer pins and a retainer ring which holds the retaining pins within radially extending slots in the valve seat disc and within an annular groove at one end of the valve stem received in the bore. Typically, a spring is received within the axial bore in the valve seat disc and is positioned between the valve stem and the interior end of the bore in the valve seat disc. The bore has a larger diameter than the valve stem so that limited lateral movement of the valve seat disc relative to the axis of the valve stem is permitted to provide a valve seat disc which is self-aligning when the valve stem is moved to a valve closed position. Again, it is apparent that this valve assembly has a number of parts, is awkward and complicated to assemble, and consequently is expensive to manufacture.

It will be appreciated that by having several parts, the known valve assemblies described above have the disadvantage of being relatively expensive to manufacture and assemble. The present invention overcomes this disadvantage by providing an integral member such as a molded part which is snap-fittingly connected to an end portion, such as a button, of another member or part. More specifically, the present invention provides a one-piece valve seat disc which is snap-fittingly mounted on the end of a metal valve stem in a valve assembly. In accordance with one embodiment of the invention, the valve seat disc: is made from a material which is stiff but resilient and which has a low coefficient of friction with respect to metal to permit relative rotation between the disc and the stem when the stem bears against the disc; has a central axis along which it is moved when mounted in the valve assembly; and, is defined by a seating section having a seating surface for seating on a valve seat and by a valve stem coupling section having a valve stem receiving opening with projections therein for snap-fittingly receiving an end portion of the valve stem. The lateral extent of the opening in the coupling section is somewhat larger than the end portion of the valve stem received therein so that limited movement of the valve seat disc on the end portion of the valve stem is permitted whereby the valve seat disc is self-aligning so as to align the axis of the disc with the axis of the valve seat when the axis of the valve stem is not aligned with the axis of the valve seat.

A primary object of the present invention is to provide an integral member or molded part which is adapted to be snap-fittingly connected to an end portion of another member.

Another object of the present invention is to provide an improved valve assembly including a valve seat disc and a valve stem which are simple to make, and relatively inexpensive to manufacture and assemble.

Another object of the present invention is to provide a valve assembly including a valve stem and a valve seat disc which has an inner, axially facing, surface against which a flat end portion of the valve stem can bear for urging said valve seat disc to a valve closed position against a valve seat.

Another object of the present invention is to provide a one-piece valve seat disc which is snap-fittingly mounted on the end of a valve stem.

Another object of the present invention is to provide a valve seat disc which has a simple configuration so that it can be molded in one piece from a plastic material.

Another object of the present invention is to provide a valve seat disc of one-piece construction which is adapted to be snap-fittingly mounted on the end of a valve stem in such a way that the valve seat disc can move a limited distance laterally of the valve stem whereby the valve seat disc is self-aligning when the valve stem is moved to a valve closed position.

Another object of the present invention is to provide a valve seat disc of one piece construction which can be mounted on the end of a valve stem without the use of other parts.

Another object of the present invention is to provide a valve seat disc which is molded from a plastic material having a low coefficient of friction with respect to metal and which is stiff but resilient.

Another object of the present invention is to provide a valve seat disc of one-piece construction which is self-aligning when moved to a valve closed position against a valve seat.

Another object of the present invention is to provide a valve seat disc including a valve seating section and a valve stem coupling section having an opening for snap-fittingly receiving an end portion of a valve stem.

Another object of the present invention is to provide a valve seat disc which can be easily replaced without the need for special tools or skills.

Another object of the present invention is to provide a valve seat disc including a valve seating section and a valve stem coupling section having an opening with nubs extending laterally into the opening for snap-fittingly receiving an end portion of a valve stem, the en portion being forced past the nubs and then retained by the nubs in the opening.

Another object of the present invention is to provide a valve seat disc including a valve seating section and a valve stem coupling section having an opening with barbs extending laterally into the opening, each barb being yieldable into a recess formed in a side surface defining part of the opening when an end portion of a valve stem is snap-fittingly received in the opening.

Another object of the present invention is to provide a valve seat disc including a valve seating section and a valve stem coupling section having an opening with barbs extending laterally into the opening, each barb being yieldable into a recess formed in a side surface defining part of the opening when an end portion of a valve stem is snap-fittingly received in the opening, and each barb having means, such as a protuberance, which extends from the barb in a direction axially of the disc for engaging a part of the end portion of the valve stem for resiliently holding the disc to the end portion to prevent relative axial movement between the disc and stem.

Another object of the present invention is to provide a valve seat disc including a valve seating section and a valve stem coupling section having an opening with barbs extending laterally into the opening, each barb being yieldable into a recessformed in a side surface defining part of the opening when an end portion of a valve stem is snap-fittingly received in the opening, and each of the barbs having an inwardly extending arcuate (partially circular) end surface which cooperates with an arcuate surface defining part of the opening to form cylindrical surface sections which provide a more positive retention of a cylindrical end portion of the valve stem within the opening and which prevent misalignment of the valve seat disc relative to the valve stem.

Still another object of the present invention is to provide a valve assembly in which a valve seat disc having a seating section with a seating surface and having a valve stem coupling section with a valve stem receiving opening is mounted at one end of a valve stem having a coupling formation defined by a disc shaped button and a reduced diameter shank connecting the button to the valve stem, the coupling formation having an annular groove defined between the disc shaped button and the valve stem radially outwardly of the shank and a relatively thin portion of the valve seat disc is received in the annular groove and is only strong enough to withstand the small axial force exerted thereon by the button when the valve stem is moved to a valve open position.

For a more complete understanding of the nature and scope of the present invention reference may now be had to the following detailed description of the preferred embodiments of the invention taken in conjunction with the accompanying drawings wherein:

FIG. 6 is an elevational view of a portion of a valve stem similar to the valve stem shown in FIG. 1;

FIG. 7 is a sectional view of a modified valve seat disc which is similar to the disc shown in FIGS. 5 and 6 and which is adapted to be mounted at the end of the valve stem shown in FIG. 6;

FIG. 8 is an end view of the valve seat disc shown in FIG. 7 taken along line 8—8 of FIG. 7; and, FIG. 9 is a side view of the valve seat disc shown in FIGS. 7 and 8 taken along line 9—9 of FIG. 8.

Figure 1:
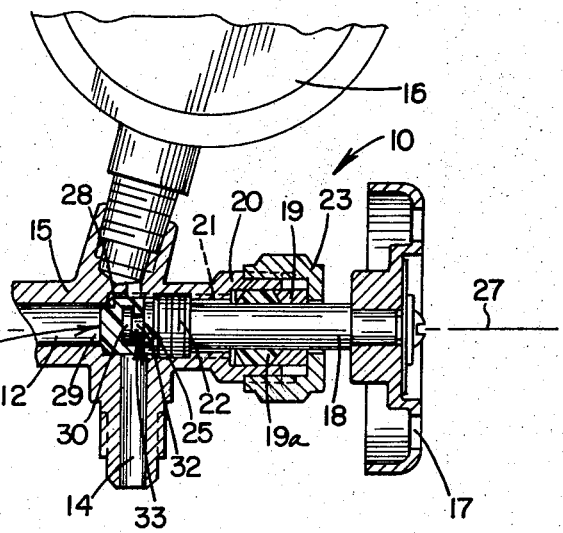
FIG. 1 is a fragmentary sectional view of the valve seat disc of the present invention mounted at the end of a valve stem in a valve assembly.

Referring to the drawings in greater detail, a valve assembly is generally indicated at 10 in FIG. 1 and is arranged to control the flow of fluid between a passage 12 and a passage 14 in a valve body 15. In the illustrated embodiment a gauge 16 is attached to the valve body 15 for indicating the pressure of the fluid in the passage 14.

The valve assembly 10 includes a conventional hand wheel 17 secured to the outer end of a valve stem 18 which is received through a packing gland 19 and packing 19a in a tubular portion 20 of the valve body 15. The tubular portion 20 has internal threads 21 and the valve stem 18 has external threads 22 engageable with the threads 21 for rotatably reciprocating the valve stem 18 within the tubular portion 20. An apertured cap 23 is secured over the outer end of the tubular portion 20 for retaining the packing gland 19, the packing 19a and the threaded portion 22 of the valve stem 18 within the tubular portion 20.

One embodiment of the valve seat disc of the present invention is generally indicated at 24 and is mounted on a coupling formation 25 at the inner end of the valve stem 18. It will be understood that, when the valve stem 18 is rotated by turning the hand wheel 17, the valve seat disc 24 is moved along the longitudinal axis 27 of the valve stem 18 to and from a valve closed position where the valve seat disc 24 seats on a valve seat 28 at the entrance 29 to the passage 12. The coupling formation 25 at the inner end of the valve stem 18 is defined by a disc shaped, pressure applying button 30 and a reduced diameter shank 32 connecting the button 30 to the valve stem 18. This coupling formation is easily formed by cutting an annular groove 33 in the valve stem 18 at the inner end thereof with the annular groove 33 being defined between the button 30 and the valve stem 18 radially outwardly from the reduced diameter shank 32.

Figure 3:
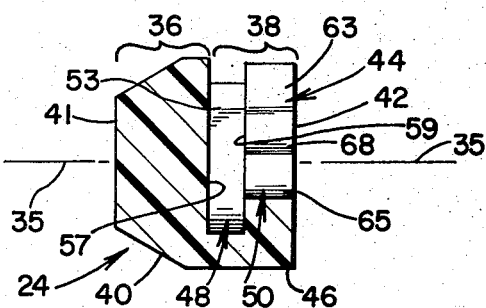
FIG. 3 is a sectional view of the valve seat disc taken along line 3—3 of FIG. 2.

Referring now to FIG. 3, the valve seat disc 24 is of one-piece construction, being molded from a plastic material such as nylon, and has a central axis 35 along which it is moved in the valve assembly 10. The valve seat disc 24 is defined by a seating section 36 and a valve stem coupling section 38. The seating section 36 is solid throughout and includes a generally axially facing seating surface 40, which, as shown in FIG. 3, is a frusto-conical surface facing both axially and laterally of the central axis 35, and an end surface 41.

Figure 2:
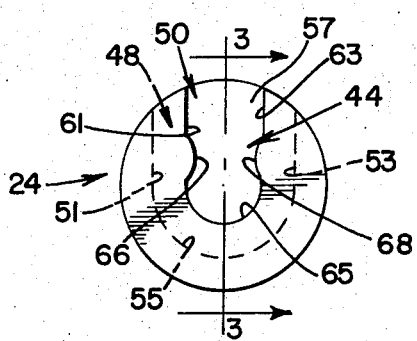
FIG. 2 is an end view of the valve seat disc shown in FIG. 1.

The valve stem coupling section 38 has an end surface 42, which faces toward the valve stem 18 when the valve seat disc 24 is mounted on the valve stem 18, and an opening 44 which extends laterally into the valve seat disc 24 from an outer peripheral side surface 46 of the valve seat disc 24. As shown in FIG. 2, the surface 46 is generally cylindrical, and the opening 44 is defined by stepped, first and second laterally extending U-shaped notches 48 and 50. It will be understood that the first U-shaped notch 48 is larger and is adapted to receive the button 30 and the second U-shaped notch 50 is smaller and is adapted to receive the shank 32 when the valve seat disc 24 is mounted on the coupling formation 25 of the valve stem 18.

The first U-shaped notch is defined between first and second generally parallel spaced, laterally extending and oppositely facing generally planar side surfaces 51 and 53 which are connected by and blend into a concave arcuate surface 55 as shown in FIG. 2. The first U-shaped opening 48 opens laterally, at the top of the U, onto the peripheral surface 46. The axial extent of the first U-shaped notch 48 is defined between first and second axially and oppositely facing surfaces 57 and 59 as shown in FIG. 3. The surface 57 is continuous and provides a bearing surface against which the end surface of the button 30 bears when the valve seat disc 24 is mounted on the valve stem 18 and the valve stem 18 is rotated to a valve closed position. It is to be noted that this bearing surface 57 distributes the pressure or force applied to the seating section 36 of the valve seat disc 24 by the button 30. Also, it is to be noted that the axial thickness of the valve seating section 36 is greater than the axial thickness of the coupling section 38 to permit relatively large sealing forces to be applied to the valve seating section 36.

The second, and smaller, U-shaped notch 50 opens laterally, at the top of the U, onto the peripheral side surface 46. Also, the second U-shaped notch 50 opens axially on one side onto the end surface 42 and on the other side into the first, and larger, U-shaped notch 48. The second U-shaped notch 50 is defined by generally parallel spaced, laterally extending and oppositely facing generally planar side surfaces 61 and 63 which are connected by a concave arcuate surface 65. As best shown in FIG. 2, the side surfaces 61 and 63 each have a nub (projection or protuberance) 66, 68 extending laterally outwardly therefrom. These nubs 66 and 68 provide a means for snap-fittingly retaining the valve seat disc 24 on the coupling formation 25 of the valve stem 18. In this respect, when mounting the valve seat disc 24 on the valve stem 18, the shank 32 is forced past the nubs 66 and 68 into the bight portion (defined between the nubs 66 and 68 and the concave arcuate surface 65) of the U-shaped notch 50 and retained within the bight portion by the nubs 66 and 68. Since the major force applied to the valve seat disc 24 is applied to the seating section 36 and not to the coupling section 38, the portion of the coupling section 38 between the end surface 42 and the surface 59 need not be very thick or very strong. Therefore, the portion between the end surface 42 and the surface 59 can be relatively thin having only a strength sufficient to withstand the small force exerted thereon by the button 30 when it retracts the valve seat disc 24 from the valve seat 28 while moving to a valve opened position.

Preferably, and as shown in FIG. 1, the radii of the concave arcuate surfaces 55 and 65 are somewhat greater than the respective radii of the button 30 and the shank 32 such that limited lateral movement is permitted between the valve seat disc 24 and the coupling formation 25. In this way, the valve seat disc 24 will be self-aligning when it is moved against a valve seat, such as the valve seat 28. In other words, if the axis of the valve stem 18 is not coincident with the axis of the valve seat 28 at the entrance 29 to the passage 14, the valve seat disc 24 will shift laterally of the valve stem 18 when the disc 24 comes in contact with valve seat 28 to properly seat the valve seat disc 24 on the valve seat 28 with the axis 35 of the valve seat in line (coincident) with the axis of the valve seat 28.

Also, preferably, the valve seat disc 24 is made from a moldable plastic material which is tough and stiff, but yet resilient, and which has a low coefficient of friction with respect to metal to permit relative rotational movement between the metal valve stem 18 and the valve seat disc 24 when the stem 18 bears against the disc 24. One such plastic material which has these physical characteristics is a nylon or glass filled nylon material. However, it is to be understood that the valve seat disc 24 can be made from other materials which have these physical characteristics. In some applications the valve seat disc 24 can even be made from a metal.

Figure 4:
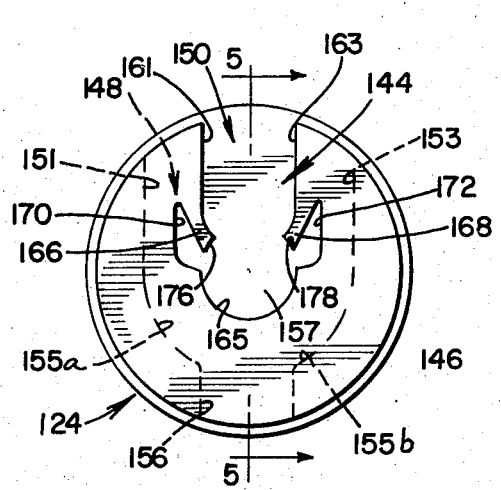
FIG. 4 is an end view of a modified valve seat disc adapted for use in larger valve assemblies.
Figure 5:
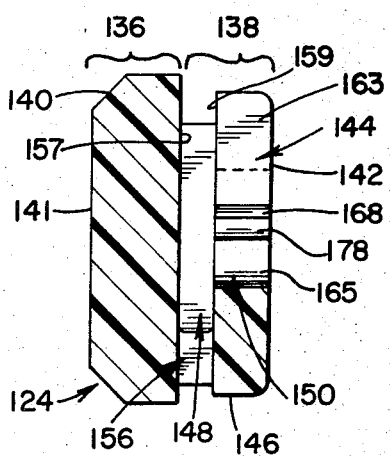
FIG. 5 is a sectional view of the modified valve seat disc taken along line 5—5 of FIG. 4.

Referring now to FIGS. 4 and 5, a modified valve seat disc is generally indicated at 124. This modified valve seat disc 124 is particularly adapted for use in larger valve assemblies. Also, this modified valve seat disc 124 has a slightly different means for snap-fittingly retaining the valve seat disc 124 on the end of a valve stem.

As shown in FIG. 5, the valve seat disc 124 has a central axis 135 and is defined by a valve seating section 136 and a valve stem coupling section 138. The valve seating section 136 includes a generally axially facing (conical) seating surface 140 and an end surface 141. The valve stem coupling section 138 has an axially facing end surface 142 and a valve stem receiving opening 144, which extends laterally inwardly of the valve seat disc 124 from a peripheral cylindrical surface 146 of the valve stem coupling section 136. As shown in FIG. 4, the opening 144 is defined by stepped first and second laterally extending U-shaped notches 148 and 150.

The first U-shaped notch 148 is larger and is defined by generally parallel spaced, laterally extending and oppositely facing generally planar side surfaces 151 and 153 and first and second concave arcuate surfaces 155a and 155b which together define part of the bight portion of the first U-shaped notch 148. The first U-shaped notch 148 opens laterally, at the top of the U, onto the peripheral surface 146. In this modified valve seat disc 124, the bight portion of the first U-shaped notch 148 opens through a slot 156 onto the peripheral side surface 146 of the valve stem coupling section 136. The axial extent of the first U-shaped notch 148 is defined between first and second axially and oppositely facing surfaces 157 and 159 as best shown in FIG. 5. It will be understood that the surface 157 provides a continuous bearing surface which extends across a major portion of the valve seat disc 124 and against which a button at the end of a valve stem, similar to the button 30 shown in FIG. 1, can bear when the valve seat disc 124 is mounted on a valve stem and moved by the valve stem to a valve closed position.

The second, and smaller, U-shaped notch 150 also opens laterally, at the top of the U, onto the peripheral surface 146. As shown in FIG. 4 the second U-shaped notch 150 is defined by generally parallel spaced laterally extending and oppositely facing generally planar side surfaces 161 and 163 and a concave arcuate surface 165.

Instead of having nubs, such as the nubs 66 and 68 shown in FIG. 2, for snap-fittingly retaining the valve seat disc 124 on a valve stem, the modified valve seat disc 124 utilizes barbs 166 and 168 which extend outwardly from respective side surfaces 161 and 163 and which are adapted to be forced into respective recesses 170 and 172 extending inwardly from each of the side surfaces 161 and 163. It will be understood that the barbs 166 and 168 are forced into the recesses 170 and 172 when the valve seat disc 124 is mounted to a coupling formation. After the shank of the coupling formation is forced past the barbs 166 and 168, they will snap back to the position shown in FIG. 4 and retain the shank within the bight portion of the second U-shaped notch 148.

As best shown in FIG. 4, the outer ends of the barbs 166 and 168 have laterally extending end surfaces 176 and 178 which are arcuate and which face inwardly toward the concave arcuate surface 165. The arcuate surfaces 165, 176 and 178 defined partially cylindrical surfaces or cylindrical surface sections. By having partially cylindrical end surfaces 176 and 178 on the barbs 166 and 168, a more positive retention of a cylindrical shank is obtained. Moreover the partially cylindrical bight portion defined between the surfaces 165, 176 and 178 provides a more positive alignment of the valve seat disc 124 with a cylindrical shank at the end of a valve stem.

It will be noted that the seating section 136 is solid and continuous throughout and can be made from a fiber reinforced plastic material, such as a glass filled nylon material, so that large pressures can be applied against the bearing surface 157 when forcing the conical seating surface 140 and/or the end surface 141 against a valve seat.

As in the first embodiment of the valve seat disc 24 shown in FIGS. 1–3, the radii of the concave arcuate surfaces 155a and 155b and 165 are larger than the radii of the button and shank respectively of a coupling formation received in the opening 144 so that limited lateral movement of the valve seat disc 124 transversely of the axis of the valve stem is permitted to provide a self-aligning valve seat disc 124 when the valve seat disc 124 is moved to a valve closed position against a valve seat.

Referring now to FIG. 6, another type of valve stem, similar to the valve stem 18 in FIG. 1, is indicated at 218. The stem 218 has a threaded portion 222 and an outwardly flared flange portion 223 and is adapted to mount a valve seat disc 224 (FIGS. 7–9) on a coupling formation 225 formed at one end of the stem 218 and located centrally of the central axis 227 of the stem 218. The coupling formation 225 is defined by: a disc shape button 230 having an axially facing pressure applying surface 230a and an annular, axially facing surface 230b; and a reduced diameter shank portion 232 formed in the stem 218 between the button 230 and the flange portion 223 so as to define an annular groove 233 between the button 230 and the flange portion 223.

The valve stem 18 differs from the valve stem 218 in that the threaded portion 222 of the stem 218 is located further behind the coupling formation 225, in that the button 230 has a larger diameter than the stem 218, and by the provision of the flange portion 223.

The coupling formation 225 is particularly adapted for mounting the larger size valve discs, such as the valve disc 124 shown in FIGS. 4 and 5 or the similar disc 224 shown in FIGS. 7, 8 and 9.

The modified valve seat disc 224 is, in many respects, identical to the valve seat disc 124 shown in FIGS. 4 and 5. Accordingly, portions of the valve seat disc 224 which are identical or similar to portions of the valve seat disc 124 will be identified with reference numerals having the same tens and units numbers as used for identifying such similar or identical portions. However, these reference numerals will be in the "200" series.

Thus, the valve seat disc 225 has: a central axis 235; a valve seating section 236; a valve stem coupling section 238; an axially facing seating surface 240; an end surface 241; an axially facing end surface 242; a valve stem receiving opening 244; a peripheral side surface 246; stepped first and second laterally extending U-shaped notches 248 and 250, the U-shaped notch 248 being defined by surfaces 251, 253, 255a and 255b with a slot 256 extending from the U-shaped notch 248 to the peripheral side surface 246, the U-shaped notch 248 extending axially of the disc 224 between first and second axially and oppositely facing surfaces 257 and 259, and the smaller U-shaped notch 250 being defined by surfaces 261, 263 and 265; barbs 266 and 268 extending from the side surfaces 261 and 263 and being adapted to be forced into recesses 270 and 272 extending inwardly from each of the side surfaces 261 and 263; and each of the barbs 266 and 268 having arcuate or partially cylindrical end surfaces 276 and 278.

An important difference between the modified valve seat disc 224 and the valve seat disc 124 is the size, construction and arrangement of the barbs 266 and 268. In this respect: the barbs 266 and 268 are larger and longer than the barbs 166 and 168 as are also the recesses 270 and 272 into which the barbs are deflected; the barbs 266 and 268 extend further into the U-shaped notch 250; end surfaces 276 and 278 have a greater arcuate extent than the arcuate surfaces 176 and 178; and the end surfaces 276 and 278 are more equidistantly spaced from each other and from the arcuate surface 265 defining part of the U-shaped notch 248 (FIG. 8), so that the barbs 266 and 268 can exert a greater, stronger, and more effective holding force against the shank portion 232 of the valve coupling formation 225 which is snap-fittingly inserted into the opening 244 than is obtained with the barbs 166 and 168.

Additionally, each of the barbs 266 and 268 has nub, bump or protuberance 280, 282 extending respectively from each of the barbs 266 and 268 outwardly from the surface 259 toward and into the U-shaped notch 248. These nubs or protuberances 280 and 282 are adapted to engage the annular surface 230b of the button 230.

When the valve seat disc 224 and coupling formation 225 are brought into coupling engagement such as by moving the disc 224 toward and onto the coupling formation 225 shown in FIG. 6 as indicated by the arrow 285 in FIG. 7, the barbs 266 and 268 will be deflected into the recesses 270 and 272 until the shank portion 232 is moved past the ends of the barbs 266 and 268 and against the arcuate surface 265, at which time the barbs will snap back to essentially their original position shown in FIG. 8 with the arcuate surfaces 276 and 278 at the ends of the barbs 266 and 268 positioned to retain the shank portion 232 within the bight portion 258 of the U-shaped notch 250 for holding the valve seat disc 224 on the coupling formation 225 of the valve stem while at the same time permitting limited lateral movement of the valve seat disc 224 relative to the axis 227 of the valve stem 218.

When the coupling formation 255 and the valve seat disc 224 are brought together, the nubs 280 and 282 will bear against the annular surface 230b of the button 230 and the barbs 226. 286 will be deflected or raised in direction parallel to the axis 235 of the disc 224. When this occurs, the barbs 266 and 268 will be subjected to a small bending stress which has the effect of forcing the end surface 230a of the button 230 against the axially facing bearing surface 257 so that the valve seat disc 224 is firmly held in axial abutting engagement with the button 230 of the coupling formation 224. However, in view of the low coefficient of the material from which the valve seat disc 224 is made relative to the material, such as metal from which the valve stem 218 is made, and in view of the small bending stresses developed in the barbs 266 and 268, the valve seat disc is still permitted to move laterally a small distance relative to the axis 227 of the valve stem 218 and is permitted to rotate relative to the valve stem 218.

By providing the nubs or protuberances 280 and 282 on the barbs 266 and 268, the valve seat disc 224 is firmly held to the coupling formation 225. In some applications, such as under turbulent flow conditions, it is important that the valve seat disc be firmly held to the vaLve stem 218. Under such turbulent flow conditions, a loose valve seat disc could vibrate and, over a period of time, wear of the valve seat disc, as a result of the vibration, will result in increased vibration to the extent that the disc or stem may be damaged. This may be particularly so when the valve seat disc is made of a plastic material.

A valve seat disc constructed according to the teachings of the present invention is simple and inexpensive to manufacture, and is easy to assemble on a valve stem without the use of additional parts. Moreover, the valve seat disc 24, 124 or 224 can be easily replaced without the need for special tools or skills.

Additionally, it is to be understood that the coupling formed between the coupling formation 25, 125 or 225 on one part, and the coupling section 36, 136 and 236 which is on another part, and which has an opening 44, 144 or 244 with nubs 66 and 68 or barbs 166, 168 or 266, 268 for providing a snap-fitting coupling engagement between the coupling formation and the coupling sections, can be utilized in other applications in addition to the use thereof in a valve assembly as described above. In this respect, it is to be understood that the coupling section as hereinbefore defined, can find application in other molded parts such as in a doorknob for a door handle in an automobile and also, possibly in a plastic head for use in a fastener assembly in which the plastic head is snap-fitted on a fastener instead of being molding on the fastener (See U.S. Pat. No. 3,557,654 issued to H. C. Weidner, Jr. on Jan. 26, 1971).

Thus it will be understood from the foregoing description that the present invention provides an integral molded member or part, an improved valve seat disc and an improved valve assembly which have numerous advantages and applications, some of which have been described above and others of which are inherent in the invention. Therefore, the scope of the present invention is only to be limited as required by the following claims.

I claim:

1. In a valve assembly, the combination of an axially extending valve stem and a valve seat disc mounted on one end of said valve stem, said valve stem having a valve seat disc coupling formation at one end thereof which includes a radially extending disc shaped button, said valve seat disc being made from a material which has a low coefficient of friction with respect to the material from which said stem is made and which is stiff but resilient, said valve seat disc having a central axis and a peripheral side surface facing laterally outwardly from said central axis, and said valve seat disc being defined by a seating section having a seating surface and a valve stem coupling section having an axially facing end surface and first and second generally U-shaped notches which extend laterally of said valve seat disc for receiving said coupling formation at said one end of said valve stem, said first generally U-shaped notch opening, at the top of the U, onto said peripheral side surface, and said second generally U-shaped notch, which is smaller than said first U-shaped notch, also opening at the top of the U onto said peripheral side surface, and said second generally U-shaped notch, which is smaller than said first U-shaped notch, also opening at the top of the U onto said peripheral side surface and opening on one side onto said end surface and on the other side into said first generally U-shaped notch, and one of said notches having means for snap-fittingly receiving said coupling formation within said notches and for retaining said coupling formation within said notches when said valve seat disc is coupled to said valve stem, said valve seat disc being loosely retained on said valve stem with respect to lateral movement thereof in such a way that said valve seat disc move a small distance laterally of said valve stem to provide a valve seat disc which is self-aligning when said valve seat disc is moved into seating engagement with a valve seat, said retaining means also including means for holding said disc firmly against axial movement thereof with respect to said button.

2. The valve assembly of claim 1 in which the second generally U-shaped notch is defined by laterally extending, oppositely facing side surfaces and an end surface connecting said notch side surfaces, and in which the means for retaining said coupling formation includes at least barbs each of which extends from one of said side surfaces in a direction toward said end surface of said second generally U-shaped notch, and each of said barbs is yieldable into a recess formed in each one of said notch side surfaces whereby, during coupling engagement of said disc and said stem, a portion of the stem can be easily and snap-fittingly forced past said barbs into, and then retained by said barbs within a bight portion of said second generally U-shaped opening defined between said barbs and said notch end surface of said second generally U-shaped notch.

3. In a valve assembly, the combination of a valve body, a threaded axially extending valve stem rotatable about its axis and axially reciprocal in said valve body, a valve seat disc, coupling means at the inner end of said valve stem for mounting said valve seat disc to said valve stem, said coupling means comprising a radially extending axially facing button, cooperating thread means on said stem and body for moving said valve seat disc to and from a valve seat in said valve body, said valve seat disc being made from a material which is stiff but resilient and which has a low coefficient of friction with respect to the material from which said stem is made, said disc being a unitary integral member shaped to include a seating portion thereof having a sealing surface for seating against said valve seat, and having a valve stem coupling section comprising socket means for mating with said axially facing button for holding said disc firmly against axial movement thereof relative to said button, and recess means for laterally shifting said disc on said button upon the lateral urging of said disc by said seat.

4. In a valve assembly, the combination of a valve body, a threaded axially extending valve stem rotatable about its axis and axially reciprocal in said valve body, a valve seat disc coupling means at the inner end of said valve stem, said coupling means comprising an axially facing head which is radially enlarged with respect to the radius of the valve stem adjacent said head, said head having an end face which is perpendicular to the axis of the valve stem, cooperating thread means on said stem and body for moving said valve seat disc axially to and from a valve seat in said valve body, said valve seat disc being made from a material which is stiff but resilient and which has a low coefficient of friction with respect to the material from which said stem is made, said disc being a unitary integral member shaped to include a seating portion thereof having a sealing surface for seating against said valve seat, said end face contacting said seating portion, and having a valve stem coupling section providing socket means for mating with said axially facing head for holding said disc firmly against axial movement thereof relative to said head, and recess means for laterally shifting said disc on said head upon the lateral urging of said disc by said seat.

5. The valve assembly of claim 4 wherein said mating means comprises a laterally extending slot in said disc, said disc and said head being so sized that said head fits snugly within said slot with respect to axial movement therein with respect to said disc and fits loosely therein with respect to lateral movement with respect to said disc, said slot having axially and oppositely facing surfaces, the axially inwardly facing surface adjacent the shank of the stem including axially extending projection, integral with said disc extending into said slot for holding said disc firmly against axial movement relative to said head.

6. The valve assembly of claim 4 wherein said end face has substantially the same radius as the head.

* * * * *

UNITED STATES PATENT OFFICE
CERTIFICATE OF CORRECTION

Patent No. 3,700,206     Dated October 24, 1972

Inventor(s) Evan Jones

It is certified that error appears in the above-identified patent and that said Letters Patent are hereby corrected as shown below:

In column 3, line 36, "en" should read -- end --.

In column 9, line 22, before "nub" insert -- a --.

In column 9, line 42, after "stem" insert -- 218 --.

Signed and sealed this 29th day of May 1973.

(SEAL)
Attest:

EDWARD M. FLETCHER, JR.
Attesting Officer

ROBERT GOTTSCHALK
Commissioner of Patents